United States Patent [19]
Wang

[11] Patent Number: 5,135,168
[45] Date of Patent: Aug. 4, 1992

[54] MULTI-SPRINKLER CONTROLLER

[76] Inventor: Po H. Wang, No. 91, Kuo Tai Rd., Chu Nan Chen, Miao Li Hsien, Taiwan

[21] Appl. No.: 683,232

[22] Filed: Apr. 10, 1991

Related U.S. Application Data

[63] Continuation-in-part of Ser. No. 7,548,281, Jul. 5, 1990, abandoned.

[51] Int. Cl.⁵ .............................................. A01G 27/00
[52] U.S. Cl. ...................................... 239/70; 239/71; 239/66; 137/624.18; 137/627
[58] Field of Search ................... 239/66, 69, 70, 71; 137/624.18, 624.2, 627

[56] References Cited

U.S. PATENT DOCUMENTS

| | | | |
|---|---|---|---|
| 1,753,240 | 4/1930 | Howell et al. | 239/66 |
| 2,738,807 | 3/1956 | Addison, Jr. | 137/624.18 |
| 2,777,515 | 1/1957 | Stirling | 137/624.18 |
| 2,821,434 | 1/1958 | Hunter et al. | 239/70 |
| 3,286,733 | 11/1966 | Hunter | 239/70 |
| 3,405,733 | 10/1968 | Hansen | 137/627 |
| 3,780,766 | 12/1973 | Link | 137/624.2 |
| 3,976,101 | 8/1976 | Bassett | 137/624.2 |
| 4,022,239 | 5/1977 | Schwindt et al. | 137/624.2 |
| 4,633,905 | 1/1987 | Wang | 239/69 |
| 4,807,664 | 2/1989 | Wilson et al. | 239/69 |

*Primary Examiner*—Andres Kashnikow
*Assistant Examiner*—Christopher G. Trainor
*Attorney, Agent, or Firm*—Connolly & Hutz

[57] ABSTRACT

A multi-sprinkler controller includes a timer-activated motor which drives a rotor disc. The rotor disc operates the opening and closing of several water passages through which water is supplied to the various sprinklers which make up a sprinkler system.

7 Claims, 5 Drawing Sheets

MULTI-SPRINKLER CONTROLLER

This is a continuation-in-part application of co-pending U.S. patent application Ser. No. 07/548,281 filed Jul. 5, 1990, which is now abandoned.

BACKGROUND OF THE INVENTION

This invention relates to an automated sprinkler, and, more particularly, to a timer which coordinates the operation of multiple sprinklers in an automated sprinkler system.

Applicant's U.S. Pat. No. 4,633,905 discloses a fluid flow controller to provide an automatic operation for water discharge in which a timer is utilized to control the opening and closing of a sprinkler. However, like ordinary sprinkler controllers, such a fluid flow controller cannot centrally regulate the independent supply of water to more than one sprinkler.

It is the purpose of this present invention, therefore, to mitigate and/or obviate the above-mentioned drawbacks in the manner set forth in the detailed description of the preferred embodiment.

SUMMARY OF THE INVENTION

Accordingly, it is a primary objective of this invention to provide centralized regulation of a plurality of water valves through which water is distributed to a sprinkler system.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
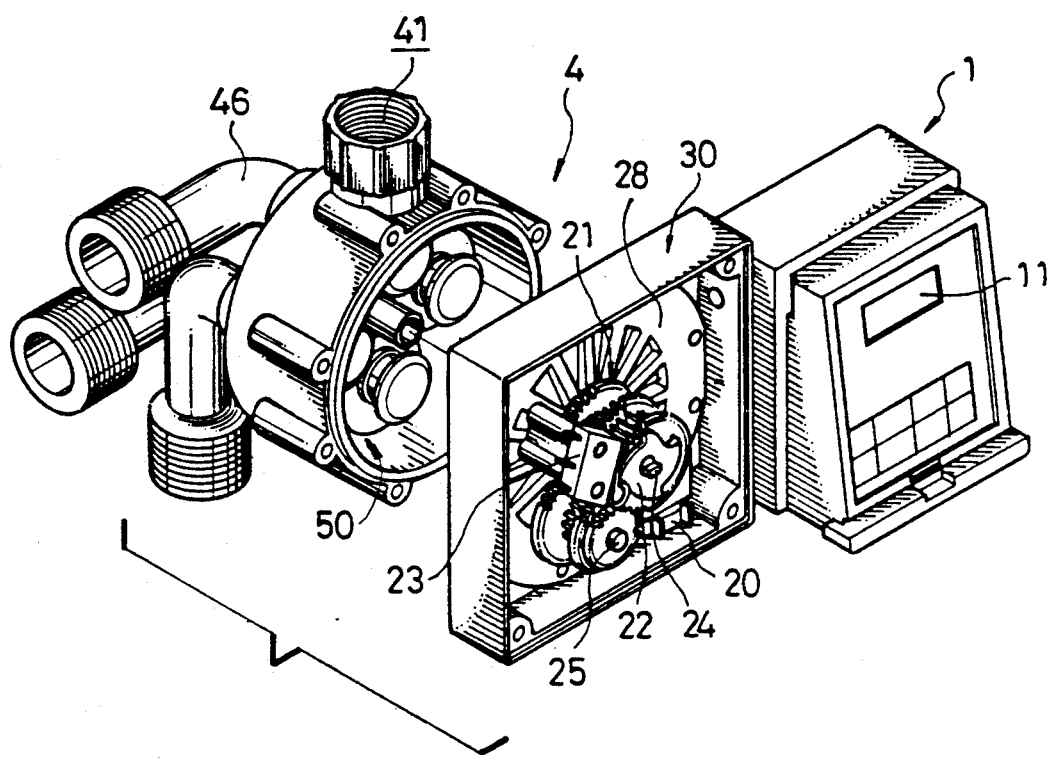
FIG. 1 is a perspective view of a multi-sprinkler controller in accordance with the present invention.

With reference to the drawings and initially to FIG. 1, a multi-sprinkler controller in accordance with the present invention comprises a timer 1, a motor 2 driven by the timer 1 and mounted within a motor seat 20, and a valve assembly 4.

Figure 2:
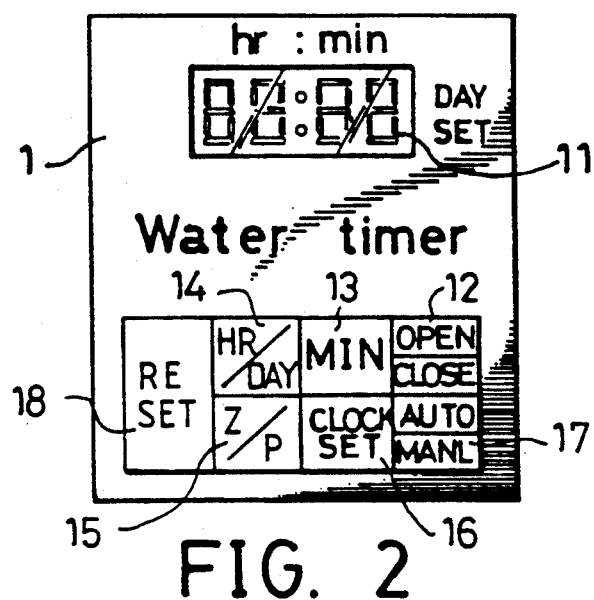
FIG. 2 is a front view of a timer of FIG. 1.
Figure 3:
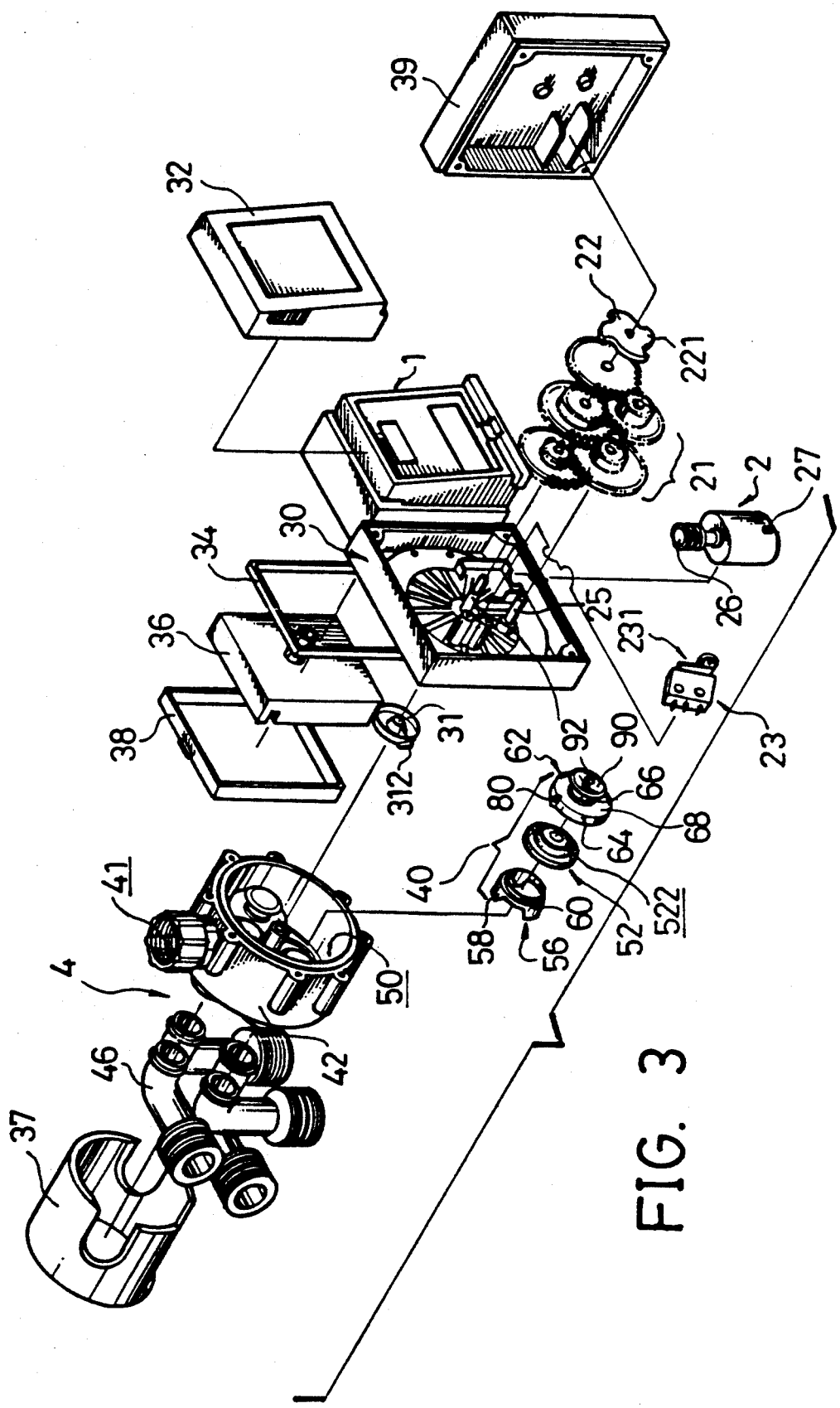
FIG. 3 is an exploded view of FIG. 1.

The timer 1, as shown in FIG. 2, is of a well-known means and, therefore, shall not be described in detail. The timer 1 preferably includes an LED or LCD display area 11 numerated in hours and minutes, as well as in months and days. The display area 11 can also display how long each sprinkler is set to sprinkle. The timer 1 also includes a plurality of control keys 12, 13, 14 and 15 for setting the appropriate day of the month and hour of the day at which each sprinkler should turn on and then turn off. A mode key 17 provides means for either automatic or manual regulation of the sprinkler system. A clock set key 16 is utilized to set the clock time and a reset key 18 is provided for resetting an update of the desired regulation of the sprinkler system or for erasing error messages. The timer front cover 32 and a washer 34, a back plate 36, and a rear cover 38 are provided to house the timer 1, as shown in FIG. 3. The timer 1 is connected to a battery cell unit, external AC, or other DC power source (not shown).

Referring to FIGS. 1 and 3, the motor 2 is housed in a casing 30 with a mount wall 28 adjacent to the timer 1. The motor 2 is operatively controlled by the timer 1 and is electrically connected to an input end 27 which is able to switch the motor 2 on or off by well-known means. An output end, such as a worm gear 26, of the motor 2 is engaged with a reduction gear assembly 21 mounted on a first shaft 24 and a second shaft 25. Both the first shaft 24 and the second shaft 25 are rotatably mounted on the mount wall 28. The timer 1 is so programmed that it can control the rotation of the motor 2 based on input data from the user, which will be discussed in detail later. A front cover 39 is provided on a front side of the casing 30.

Figure 5:
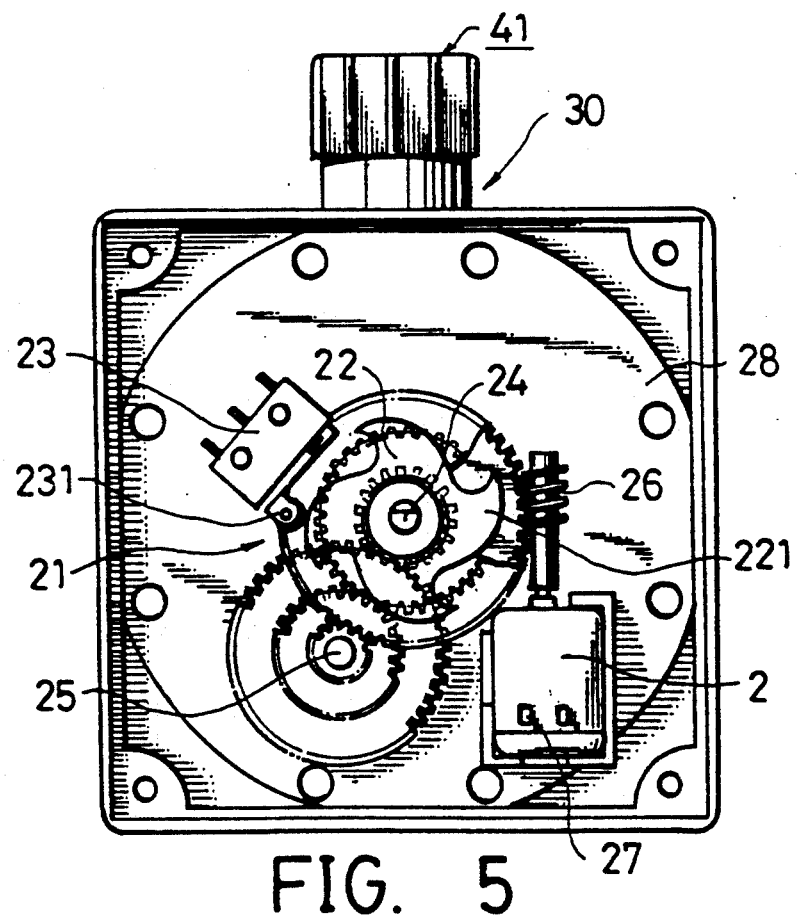
FIG. 5 is a front view showing a microswitch with a pressure sensitive wheel and a star-shape wheel driven by a motor.

With reference to FIG. 3, the motor 2 drives the reduction gear assembly 21 which, in turn, drives the first shaft 24. FIG. 5 shows that the motor 2 simultaneously drives a star-shaped wheel 22, with four equally spaced sharpened ends 221, which is also mounted on the first shaft 24. The star-shaped wheel 22 activates the microswitch 23 when one of the sharpened ends 221 impinges on a pressure sensitive wheel 231, acting in conjunction with the microswitch 23, to turn the motor 2 off, the electrical details, again, to be discussed in detail later.

Figure 4:
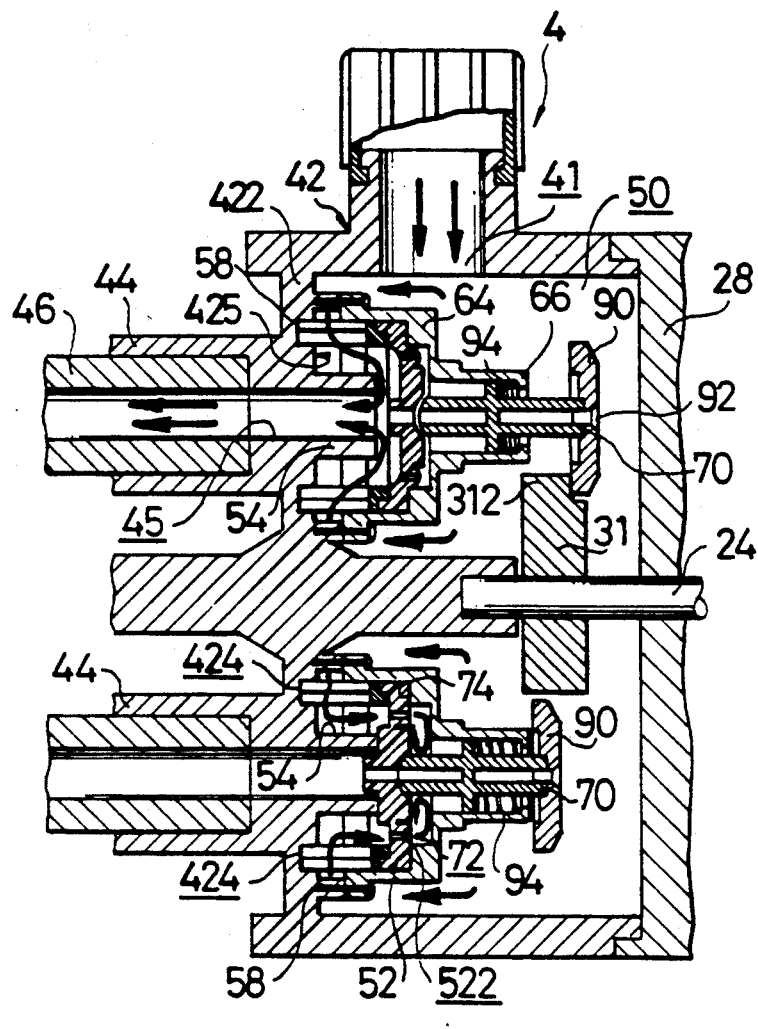
FIG. 4 is a sectional side view of a valve assembly of FIG. 1 showing the operation of tappets and a rotor disc.
Figure 6:
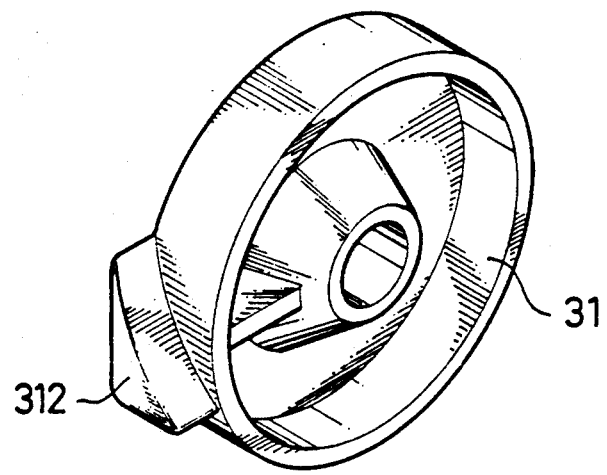
FIG. 6 is a perspective view showing a ridge formed on the rotor disc.

With reference again to FIG. 3, the first shaft 24 driven by the motor 2 causes a rotation in a rotor disc 31 mounted on the first shaft 24 at the rear side of the mount wall 28. Position of the rotor disc 31 operatively controls the valve assembly 4 by means of a ridge 312 formed on a periphery of the rotor disc 31, as shown in FIGS. 4 and 5. The ridge 312 is in functional alignment with one of the sharpened ends 221 of the star-shaped wheel 22. The ridge 312 tapers according to the direction of rotation of the rotor disc 31.

Referring to FIG. 4, the valve assembly 4 has a water inlet 41 in communication with a water supply (not shown). The valve assembly 4 has an enclosure 42 with a chamber 50, also in communication with the water inlet 41. The enclosure 42 is open at one side and mounted to the rear side of the mount wall 28, and is thus sealed by the mount wall 28, to thereby define the chamber 50. The enclosure 42 further has four conduit connectors 44 formed on a side wall 422 opposite to the open side sealed by the mount wall 28. Each conduit connector 44 is formed with a water passage 45 for connection with a water conduit 46, by means of which water is passed to the sprinkler system (not shown). Alternatively, the water conduits 46 can be integrally formed with the side wall 422 of the enclosure 42. The valve assembly 4 also includes a plurality of valve means 40 on each water passage 45. The water conduits 46 can be enclosed in a convenient and attractive housing.

On an inner surface 425 of the side wall 422 there are four hollow annular flanges 54 protruding therefrom, each communicating with its corresponding water conduit 46 via the corresponding water passage 45. Each hollow flange 54 has an outer diameter the same as an inner diameter of the water passage 45. On the inner surface 425 of the side wall 422 around each annular flange 54 there is provided an annular recess 424. Beyond each annular recess 424 are two cylinders 428, each with threaded hole (not shown), which protrude from the inner surface 425 and are diametrically disposed relative to the annular hollow flange 54.

Referring to FIGS. 3 and 4, each valve means 40 has a ring-shaped retainer 56 for each water passage 45. Each retainer 56 has four equally spaced legs 58 formed on a first side thereof and a shoulder 60 formed on a second side thereof. Each retainer 56 is positioned on the inner surface 425 with its four legs 58 disposed within the annular recess 424 over the annular hollow flange 54.

The valve means 40 further has a valve seat 62 for each water passage 45. Each valve seat 62 comprises an annular seat portion 64 which is open on one side and a protrusion 66 from an outer surface of the closed side wall 68 of the seat portion 64. The annular seat portion 64 has an annular recess 72 and an annular platform 74. A tappet 70 is provided in a central hole of the protrusion 66, coaxial with the recess 72, in such that a first end of the tappet 70 is exposed out of the protrusion 66 and a second end of the tappet 70 stays Within the central hole of the protrusion 66. A cap 90 is connected to the second end of the tappet 70 by a screw 92. Alternatively, the cap 90 may be integral with the tappet 70. A return spring 94 is provided around the tappet 70 within the protrusion 66.

The valve means 40 further has an annular resilient rubber valve membrane 52 which is received in the recess 72 of the seat portion 62, its periphery retained on the annular platform 74 by means of the shoulder 60 of the ring-shaped retainer 56. The resilient rubber valve membrane 52 has two apertures 522 formed thereon which will be discussed in more detail later.

Referring to FIGS. 3 and 4, the valve membrane 52 is positioned between the ring-shaped retainer 56 and the valve seat 62, and the legs 58 of the retainer 56 are disposed within the annular recess 424 on the side wall 422. Two lugs 80, each with a through hole and diametrically formed on the periphery of the annular seat portion 64, fix the valve seat 62 to the side wall 422 by means of screws 427 passing through the hole of each lug 80 into the threaded hole of each cylinder 428.

Still referring to FIG. 4, the valve assembly 4 is assembled with the mount wall 28. FIG. 4 shows two valve passages in which the upper cap and the second end of the upper tappet 70 are pulled outward by the ridge 312. The return spring 94 being simultaneously biased, the first end of the lower tappet 70 is restrained from pushing the resilient rubber valve membrane 522 against the annular hollow flange 54. The water passage 45 is opened since water in the chamber 50 pushes the central portion of the resilient rubber valve membrane 522 toward to the recess 72. Accordingly, when the tappet 70 is pulled outward, as shown in the upper assembly of FIG. 4, the water passage 45 is opened and water is allowed to flow into the chamber 50 from the water inlet 41. The water passes through the spaces between the legs 58 to flow into the water passage 45 in communication with the sprinkler system via the water conduit 46.

When the tappet 70 is released, as shown in the lower water passage, the return spring 94 moves the lower tappet 70 toward its original position, pushing the resilient rubber membrane 522 against the hollow flange 54 such that the water passage is blocked. Since there is only one ridge 312 on the rotor disc 31, the other two unshown valve passages are also blocked like the lower passage. In addition, the water flows into the annular recess 72 via the two holes 522 in the resilient rubber valve membrane 52 to act on the surface, which faces the recess 72, of the rubber valve membrane 52, so as to enhance the blockage of the water passage.

When the motor 2 rotates rotor disc 31 through 90°, the pressure sensitive wheel 231 is impinged on by another of the sharpened ends 221 of the star-shaped wheel 22. The microswitch 23 hereby sends a message to the timer, marking that the ridge 312 is in alignment with another tappet 70. Alignment of the ridge 312 with another tappet 70 is coincident with impingement of one of the sharpened ends 221 of the star-shaped wheel 22. The timer 1 thereby switches the motor 2 off. With reference to FIG. 4, the upper passage will then be blocked since the upper tappet 70 is released. One of the other three passages will be opened, as its tappet 70 is pulled outward by the ridge 312, and water will be allowed to flow.

Operation

In automatic operation, the user may wish the first, the second, the third, and the fourth sprinkler respectively to sequentially sprinkle for one, two, three, and four minutes at a desired time, say 9:00 AM on Dec. 1, 1990. The user would first input the corresponding data into the timer 1. Initially, the ridge 312 of the rotor disc 31 is located between two tappets, say the fourth tappet and the first tappet. None of the tappets 70 is in alignment with the ridge 312, and all of the tappets are therefore unbiased such that no water flows into any of the water conduits 46.

At a pre-set time, the timer 1 switches the motor on to rotate clockwise, which, in turn, rotates the star-shaped wheel 22 and the rotor disc 31. When the ridge 312 becomes in alignment with the first tappet and pulls it outward, the associated impingement of the pressure sensitive wheel 231 of the microswitch 23 by one of the sharpened ends 221 of the star-shaped wheel 22 causes the timer 1 to switch the motor 2 off. Accordingly, water from the water inlet 41 is allowed to pass through the first water passage 45 to the first sprinkler for one minute and the timer 1 displays that the first sprinkler is sprinkling.

After one minute, the timer 1 causes the motor 2 to again rotate clockwise, which, in turn, rotates the star-shaped wheel 22 and the rotor disc 31 through 90°. The timer 1 switches the motor 2 off upon impingement of the pressure sensitive wheel 231 of the microswitch 23 by one of the sharpened ends 221 of the star-shaped wheel 22. The second conduit is opened when its tappet 70 is pulled outward by the ridge 312. The second sprinkler sprinkles for two minutes. The display of the timer 1 is changed to indicate that it is the second sprinkler that is sprinkling. Then the timer 1 causes the motor 2 to clockwise rotate through another 90° to open the third sprinkler, causing it to sprinkle for three minutes, and finally the fourth sprinkler sprinkles for four minutes. After the fourth sprinkler sprinkles for four minutes, the timer 1 switches the motor on to rotate less than 90°, such that the ridge 312 is again located between the first tappet and the fourth tappet as it was initially, and then shuts-off the motor.

In manual operation, a depression of the key 17 under manual mode will cause the motor to rotate and the sprinkler, whose number is displayed on the display area 11, to sprinkle.

It will be appreciated that the valve may comprise more than four conduits, and that the number of the sharpened ends of the star-shaped wheel will correspond with the number of conduits. As another alternative, the motor may be enabled to rotate counterclockwise.

As various embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A multi-sprinkler controller comprising: a timer with input means for the input of data of sprinkling time for a plurality of sprinklers and display means for displaying said sprinkling time of each said sprinkler; a motor being housed in a casing with a mount wall, an input end of said motor being electrically connected to and operatively controlled by said timer based on said data, an output end of said motor being engaged with a reduction gear assembly mounted on a first shaft which is rotatably mounted on said mount wall in the casing, a rotor disc being mounted on said first shaft at an outer side of said casing adjacent to said mount wall; a valve assembly comprising a water inlet in communication with a water supply and a plurality of water passages enclosed by an enclosure, each said water passage communicating to a corresponding one of said sprinklers of a sprinkler system through a respective water conduit, said valve assembly being mounted to and sealed by said mount wall, thereby defining a chamber, communicated with said water inlet, within said enclosure where said rotor disc is enclosed in said chamber, a plurality of valve means being provided to each said water passage, said rotor disc being driven by said motor to regulate the opening and closing of said water passages via said valve means under the control of said timer based on said data such that only one said water passage is opened at a time; a star-shaped wheel being mounted on said first shaft and a pressure sensitive wheel in connection with a microswitch, said star-shaped wheel having a plurality of sharpened ends, said pressure sensitive wheel being actuated by one of said sharpened ends of said star-shaped wheel upon rotation of said motor to activate said microswitch which is electrically connected to said timer to switch said motor off.

2. A multi-sprinkler controller according to claim 1, wherein said input means further comprises input keys for selecting to either automatically or manually regulate the supply of water to the sprinkler system, and for selecting a day of a month and an hour and minute of said day at which the supply of water to the sprinkler system is to begin and cease.

3. A multi-sprinkler controller according to claim 1, wherein a ridge is formed on said rotor disc and is in alignment with one of said sharpened ends of said star-shaped wheel.

4. A multi-sprinkler controller according to claim 3, wherein each said valve means comprises a valve seat with a tappet and an annular resilient rubber valve membrane received in said valve seat, said tappet being pulled outward by said ridge to release said rubber valve membrane such as to open a corresponding one of said water passages when said tappet is in alignment with said ridge, said tappet returning to an unbiased position by a return spring to close a corresponding one of said water passages when said tappet is not in alignment with said ridge.

5. A multi-sprinkler controller according to claim 4, further comprising a retainer for retaining said annular rubber valve membrane on said valve seat, a plurality of legs being formed on said retainer in which water is flowable from said chamber to a corresponding one of said water passages via spaces between said legs.

6. A multi-sprinkler controller according to claim 4, wherein said annular rubber valve membrane has two apertures thereon for enhancing the blockage of said water passage.

7. A multi-sprinkler controller according to claim 1, wherein said water conduits are integrally formed with said water passages of said valve assembly.

* * * * *